Jan. 30, 1973     F. J. CHAREWICZ ET AL     3,714,318
METHOD OF MAKING A SEALING GASKET
Original Filed Oct. 7, 1968
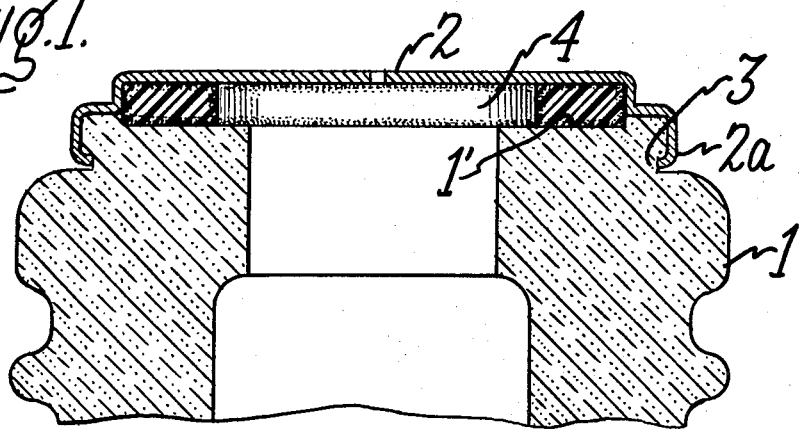
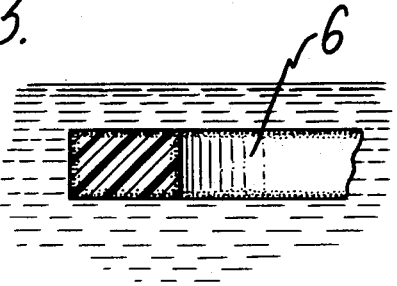
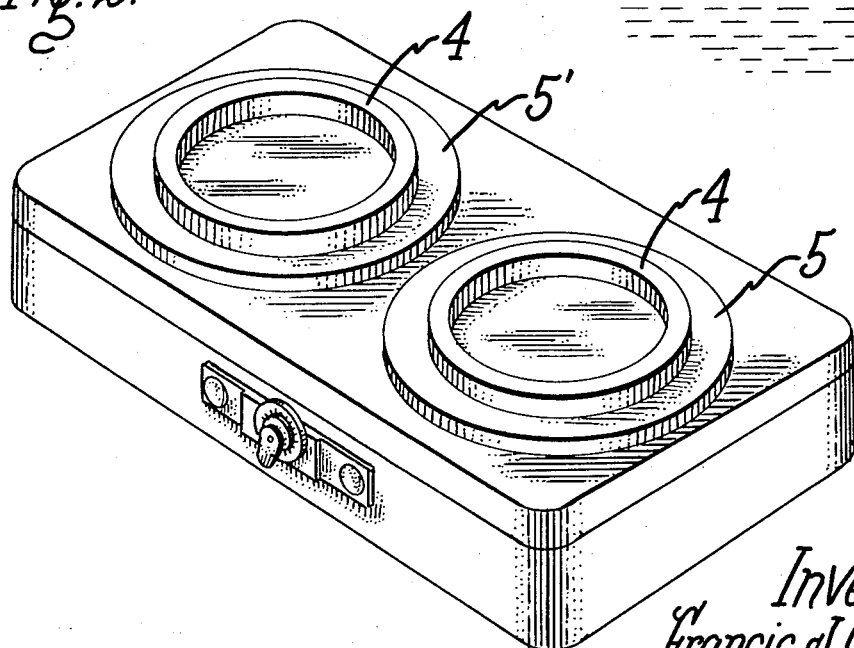
Inventors,
Francis J. Charewicz,
Eugene K. Steele,
Frank S. Nichols,
Vale P. Myles
by
Their Attorney.

United States Patent Office 3,714,318
Patented Jan. 30, 1973

3,714,318
METHOD OF MAKING A SEALING GASKET
Francis J. Charewicz, Lanesboro, Eugene K. Steele, Dalton, and Frank S. Nichols, Pittsfield, Mass., assignors to General Electric Company
Original application Oct. 7, 1968, Ser. No. 765,288, now Patent No. 3,558,145. Divided and this application Sept. 25, 1970, Ser. No. 75,780
Int. Cl. B29c 25/00; B44d 5/00
U.S. Cl. 264—236                         3 Claims

ABSTRACT OF THE DISCLOSURE

A compound gasket formed of a single piece of resilient material is provided with a resilient inner core and softer, more plastic, surface areas. The plastic surface areas of the gasket are adapted to flow readily into and around depressions and irregularities on surfaces of a lightning arrester and assembly when mounted thereon to provide a fluid-tight seal for the assembly; while the more resilient inner-core portion of the gasket is adapted to retain its resilience during the long life span demanded of lightning arrester sealing gaskets. In a preferred embodiment of the invention, the sealing gasket is formed by a reversion process in which predetermined portions of the surface of the gasket are subjected to a controlled temperature after the gasket is cured, thereby causing these surface portions to revert, or become partially uncured, and thus, change to a softer state than the inner resilient core of the gasket.

---

This is a division of application Ser. No. 765,288 filed Oct. 7, 1968 now Pat. No. 3,558,145.

This invention relates to a method of making a sealing gasket for providing a fluid-tight seal between two relatively hard, inelastic surfaces that are assembled in spaced relation and, more particularly, it relates to a sealing gasket for a lightning arrester and cap assembly; and to a method of making such a gasket.

Prior art end cap assemblies for lightning arresters are generally provided with a sealing gasket disposed between the end of the lightning arrester housing and a metallic end cap plate that is mechanically assembled over the end of the arrester housing. In addition, one or more metallic spring members are usually provided to continuously bias the metallic end cap into contact with the sealing gasket. Heretofore, such arrangements have been required because gaskets formed of relatively soft, plastic materials have been needed in order to provide a fluid-tight seal for the end cap assembly. These relatively soft gasket materials readily flow into the surface discontinuities or irregularities on the respective spaced hard surfaces of the arrester housing and the metallic end cap as desired; however, such materials do not have a suitably high degree of resiliency to effectively maintain the seal over a long period of time. Accordingly, they develop a compression set that would tend to impair the effectiveness of the seal during the course of temperature cycling of the housing and end cap over a period of years, unless the resilient spring members were provided to assure a continuing pressurized contact between those members of the assembly.

The problem of providing a sealing gasket with sufficient resiliency to resist compressive force over a considerable period of time while simultaneously having adequately soft plastic sealing surfaces to form a fluid-tight contact between juxtaposed members of the assembly has been recognized for many years. In fact, numerous efforts have been made to solve this problem by providing various types of "sandwich" gaskets that are composed of two or more layers of separate material. In such gaskets, a relatively hard, resilient core material is sandwiched between softer, more plastic layers of surface material and some means is generally provided for bonding these respective materials together. While such sandwich-type gaskets are generally suitable for providing the dual function of long-life core resilience and good surface sealing properties, they are generally quite expensive to produce and they are subject to interface separation, both before use and during use.

A primary object of the present invention, therefore, is to provide a method of making a sealing gasket that is capable of effectively sealing both liquids and gases when subjected to a wide range of temperatures, tolerances, and pressures over a substantial period of time.

A further object of the invention is to provide a method for making a sealing gasket which is characterized by providing a gasket that is superior to prior art gaskets while at the same time being relatively less expensive to produce.

Still another object of the invention is to provide a method of making a lightning arrester having a two-state sealing gasket that is characterized by having long-life core resilience in combination with fluid-tight sealing surfaces.

Yet another object of the invention is to provide a method of making a sealing gasket formed of a single material which has predetermined portions thereof in different states of hardness and resilience.

Another object of the invention is to provide a method for making an inexpensive, single element gasket that provides the dual functions normally associated with sandwich-type gaskets, but without being subject to the problems inherent in such sandwich-type gaskets.

Further advantages, features and objects of the invention will become apparent in the description that follows when taken in conjunction with the accompanying drawings, in which:

FIG. 1 is a fragmentary side elevation taken in cross section of a lightning arrester end cap assembly incorporating a sealing gasket pursuant to the teaching of the present invention.

FIG. 2 is a perspective view of a simplified type of heating apparatus shown with respect to sealing gaskets of the type formed pursuant to one of the novel methods of the invention.

FIG. 3 is a side elevation, partly in cross section of a gasket formed by an immersion process in accordance with one embodiment of the present invention.

Briefly stated, the invention contemplates a new type of two-state sealing gasket and a novel process for forming such a two-state sealing gasket for lightning arresters. In one embodiment of the invention, a lightning arrester sealing gasket is preformed of cured butyl rubber which has a relatively high degree of hardness and resilience. The outer surface areas of the gasket are reverted, or uncured, to a predetermined depth by subjecting these surfaces to a controlled temperature for a measured period of time. When the sealing gasket is thus formed, it is clamped between a metallic end cap of a lightning arrester assembly and the porcelain and surfaces of the arrester housing in a manner such that the soft, plasticised surfaces of the gasket flow readily into the irregularities of the end cap and porcelain surfaces to form a fluid-tight seal therebetween. The cured, hard resilient core of the gasket retains its resilience over a long span of years despite the high compressive pressure and temperature variations that it is subjected to when the end cap and gasket are in assembled portion on the arrester housing.

Referring now to FIG. 1, there is shown in cross section, one end of a lightning arrester housing 1 having a metallic end cap 2 fastened in assembled position thereon by means of a formed 11p portion 2a that has been bent into a preformed groove or projection 3 around the circumference of the housing 1. Disposed between the end cap or plate 2 and the upper surface of the lightning arrester housing 1 is a resilient gasket 4 which has been formed pursuant to the teachings of the present invention. It will be understood by those skilled in the art that the gasket 4 is compressed during the assembly operation between the end cap 2 and the upper surface of housing 1 to form a liquid tight seal between its upper and lower surfaces and the abutting surfaces of these member.

In order to assure a completely fluid-tight seal between the contracting surfaces of the end cap 2, the sealing surface 1' of the housing 1, and the respective top and bottom surfaces of the gasket 4, these top and bottom gasket surfaces are carefully preformed to a relatively soft state with relation to the harder or more resilient interior core portion of the gasket 4. If desired, as explained more fully below, the entire outer surface of gasket 4 can be made relatively soft with respect to the core thereof. It will be noted, however, that the gasket 4 is formed of a single piece of material, which in a preferred embodiment of the present invention is a butyl rubber having the following composition:

| Material: | Parts by weight |
|---|---|
| Butyl gum—Enjay 035 Butyl | 50 |
| $SnCl_2$ | 1 |
| T-butyl phenolic resin Rohm & Haas Amberol ST 137 | 5 |
| Hydrated alumina—$Al_2O_3(3H_2O)$ | 56 |

In this form of the invention, the butyl rubber is cured for aproximately ½ hour at 350° F. This curing process makes the entire gasket hard and quite resilient. After a suitably formed gasket has been made in this manner, pursuant to the present invention, its upper and lower surfaces are reverted, or uncured, to a predetermined depth so that these surfaces will have the desirable plastic quality necessary to assure a perfect fluid-tight seal between the gasket surfaces and the abutting surfaces of the end cap 2 and the lightning arrester housing end surface 1'.

We have found that an inexpensive and satisfactory means of attaining the desired degree of reversion of the gasket surfaces is to place the cured, preformed gaskets 4 in heat exchanging contact with a hot plate, such as the hot plates 5 and 5' shown in FIG. 2. We have also found that a suitable gasket for sealing lightning arrester housings can be formed in this manner by causing a reversion of the surfaces of gasket 4 to a depth of approximately 10 mils. With the particular butyl rubber composition described above, this approximate degree of reversion can be attained by maintaining the temperature of the hot plates 5 and 5' at approximately 840° F., then placing the gaskets 4 on the plates 5 and 5' for between 5 and 10 seconds.

It will be understood by those skilled in the art that other suitable means of heating the preformed gasket material can be utilized to effect a reversion of its surface areas. For example, it is contemplated that gaskets suitable for use as lightning arrester sealing gaskets can be made utilizing the process of the invention by placing a preformed piece of gasket material on a hot, moving plate member that reverts its lower surface, while simultaneously moving the plate and gasket beneath a radiant heat source, such as a suitable lamp, to effect reversion of its upper surface to a predetermined depth. Of course, this alternative method and other equivalents of the basic reversion technique to form a gasket are within the scope of our basic invention.

It will also be appreciated by those skilled in the art that other suitable materials, in addition to the above described butyl rubber, may be utilized to form gaskets pursuant to the present invention. For example, without limiting the intended scope of the invention, it can be noted that various neoprenes and polyurethanes, as well as natural rubber can be cured to a desirable hardness or resilience, and then predetermined portions of their surface area can be reverted pursuant to the invention, to provide the necessary plasticity of the surfaces to assure a fluid-tight seal between them and abutting spaced-apart surfaces of an assembly that must be maintained in fluid-tight relationship.

An alternative means of forming a gasket having some of the desirable features of the gasket manufactured by the above-described method of our invention is depicted in FIG. 3 of the drawing. Although the method described with reference to FIG. 3 produces a gasket that in a sense has two states for a given time, the method does not result in true reversion of a cured gasket material to an uncured state. In this embodiment of the invention, a preformed, suitably cured gasket 6 is immersed in a solvent material which serves to penetate and soften the outer surfaces of the gasket 6 thereby causing this surface to soften to a second state or degree of softness substantially below that of the uneffective central core of the gasket. In this embodiment of the invention, by way of illustration, it has been found that the outer surface of the above described butyl rubber composition can be suitably softened to a depth adequate for forming a lightning arrester sealing gasket by immersing the cured butyl rubber gasket 6 in a bath of solvent material, such as toluene, for approximately 10 minutes. During this immersion the butyl rubber does not, in fact, revert to an uncured state, but rather the outer surfaces of the gasket 6 are softened by absorption of the solvent. However, the desirable result of affecting a perfect fluid-tight seal between the outer surfaces of the gasket 6 and members such as the lightning arrester end cap 2 or the arrester housing surface 1' (of FIG. 1) are attained by placing such a processed gasket 6 in assembled position while its outer surfaces are still in this softened condition. Under such loading, or stressing, the outer surfaces are formed to a given compression set, but the inner core portion of the gasket 6 remains hard and resilient for many years.

It should be noted that with certain materials, such as toluene or xylene, this solvent-utilizing embodiment of the invention may cause a degree of chemical reversion if the cured gasket material is left in the bath long enough. This result does not affect the operativeness of the resultant two-state gasket, therefore, it is not necessary to precisely control either the strength of the solvent or the duration of time that the cured gasket remains immersed therein. It should also be pointed out that in practicing this embodiment of the invention it has been found that after a solvent-softened gasket has been allowed to dry for a sufficient time, it generally returns to essentially one state of resilience, due to the solvent leaving the outer surfaces of the gasket without having caused any irreversible chemical change in the material of the surface.

From the foregoing description of the various embodiments of the invention, it is apparent that various types of gaskets may be formed by the present invention and those skilled in the art will recognize that in applications where a substantial depth of relatively soft-state gasket material is desired on the surface of harder, more resilient core portion, the cured gasket material should be exposed to the reversion-causing heating processes described above, or immersed in the solvent bath described above, for a longer period to effect such deeper reversion. By experimentation, it has been found that for application in forming a fluid-tight seal for a lightning arrester housing a suitable two-state gasket of butyl rubber is formed when the inner, more resilient core portion has a Shore A Durometer reading of 65±10 while the reverted surface portions has a Durometer reading of about 10 to 25. Accordingly, if the composition is changed from that described above, or if substitute materials, such as neoprene for example, are used to form gaskets for this application, the particular times and temperatures for causing the desired degree of reversion noted above may be varied by experimentation until the desired Durometer readings are obtained.

While preferred embodiments of our invention have been shown and described above, it will be understood that minor changes in the details of construction and the steps of the disclosed methods of manufacture may be resorted to without departing from the spirit and scope of the invention as claimed.

What we claim as new and desire to claim as Letters Patent of the United States is:

1. The method of making a dual-state gasket comprising the steps of forming a gasket of suitably resilient gasket material, curing the gasket to a predetermined hardness, treating predetermined portions of the surface of said material to permanently uncure said portions of the surface to a depth of approximately 10 mils, whereby said portions of said surface are rendered relatively soft and conformable with respect to the harder, more resilient cured portion of the material.

2. The method of making a dual-state gasket comprising the steps of forming a gasket of cured butyl rubber, heat treating predetermined portions of the surface of said gasket for a pre-set length of time at a temperature of approximately 840° F. thereby to effect reversion of said portions of the surface to a predetermined depth, whereby said portions of said surface are rendered relatively soft and conformable relative to the harder and more resilient cured portion of the gasket, and cooling said gasket.

3. The method defined in claim 1 wherein said heat treating step comprises placing said predetermined portion of the surface of said gasket in thermal contact with a heating member the temperature of which is maintained in the range of approximately 840° F. during such contact, and wherein said predetermined portions of the surface of said gasket comprise areas on opposite sides of said gasket.

References Cited

UNITED STATES PATENTS

| | | | |
|---|---|---|---|
| 2,565,063 | 8/1951 | Briscoe | 264—346 X |
| 3,013,307 | 12/1961 | Rhoads | 264—236 X |
| 3,443,007 | 5/1969 | Hardy | 264—327 X |
| 3,394,045 | 7/1968 | Gould | 264—234 X |
| 2,493,518 | 1/1950 | Baldwin | 260—2.3 |

OTHER REFERENCES

Nourry, A., Reclaimed Rubber, 1962, Maclauren & Sons Ltd., London, England, pp. 49–50.

Whitby, G. S. et al., Synthetic Rubber, 1954, John Wiley & Sons, Inc., New York, N.Y., pp. 873–874.

ROBERT F. WHITE, Primary Examiner

R. R. KUCIA, Assistant Examiner

U.S. Cl. X.R.
264—234, 345, 346